United States Patent [19]
Crawford

[11] 4,423,904
[45] Jan. 3, 1984

[54] SEAT POSITION CONTROL MECHANISM

[75] Inventor: Ray V. Crawford, Warren, Mich.

[73] Assignee: General Motors Corporation, Detroit, Mich.

[21] Appl. No.: 282,528

[22] Filed: Jul. 13, 1981

[51] Int. Cl.³ .......................... B60N 1/02; A47C 1/02
[52] U.S. Cl. ................................... 297/341; 248/393; 296/65 R; 297/366
[58] Field of Search ............ 297/354, 378, 379, 341, 297/355, 316, 317, 366; 296/65 R; 248/393, 395, 429, 430

[56] References Cited

U.S. PATENT DOCUMENTS

| | | | |
|---|---|---|---|
| 2,160,015 | 5/1939 | Haberstump | 297/341 |
| 2,856,983 | 10/1958 | Probst et al. | 297/341 |
| 3,853,373 | 12/1974 | Corbett | 297/341 |
| 3,890,001 | 6/1975 | Turner | 297/341 |
| 3,931,995 | 1/1976 | Arai | 297/341 |
| 3,940,182 | 2/1976 | Tamura | 297/341 |
| 3,957,312 | 5/1976 | Bonnaud | 297/341 |
| 3,973,799 | 8/1976 | Berg | 296/65 R |
| 4,065,178 | 12/1977 | Carella et al. | 297/341 |
| 4,101,169 | 7/1978 | Muraishi et al. | 297/341 |
| 4,159,147 | 6/1979 | Kiyomitsu et al. | 297/341 |
| 4,248,479 | 2/1981 | Toda | 297/355 X |

FOREIGN PATENT DOCUMENTS

| | | | |
|---|---|---|---|
| 55-91427 | 7/1980 | Japan | 297/341 |
| 2033738 | 5/1980 | United Kingdom | 297/341 |
| 2091548 | 8/1982 | United Kingdom | 297/341 |

Primary Examiner—James T. McCall
Attorney, Agent, or Firm—Herbert Furman

[57] ABSTRACT

A seat position control mechanism includes an actuating member secured to a tilting seat back and operatively connectable to an actuating member by a pawl and ratchet mechanism in order to displace the seat forwardly to an easy enter position upon forward tilting movement of the seat back. A cam and follower arrangement releases a latch for the track mechanism upon coupling of the operating and actuating members. The seat back may be moved rearwardly to an inclined position without actuation of the seat position control mechanism.

4 Claims, 7 Drawing Figures

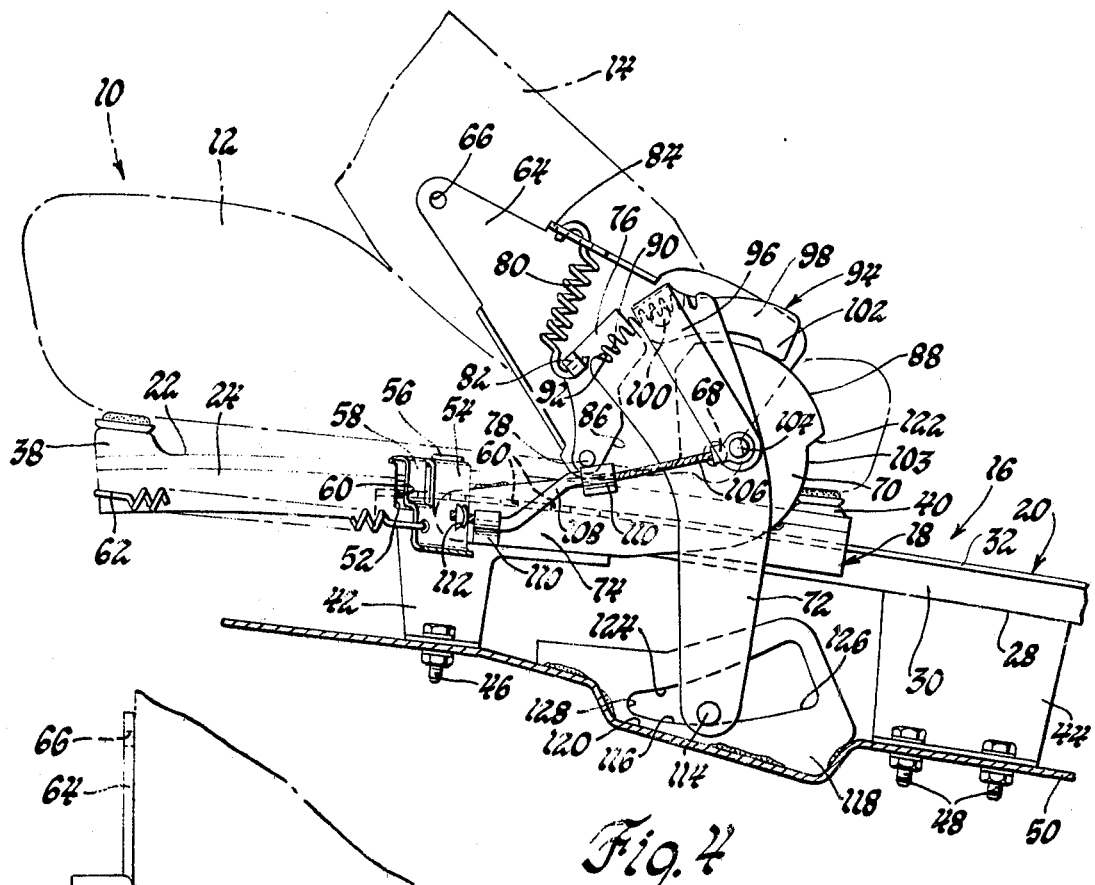
Fig. 4
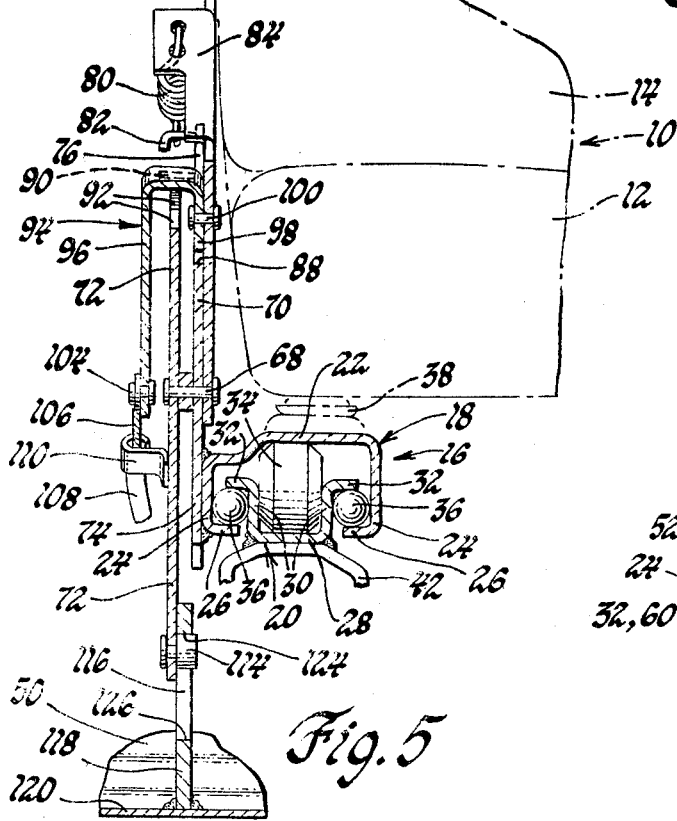
Fig. 5
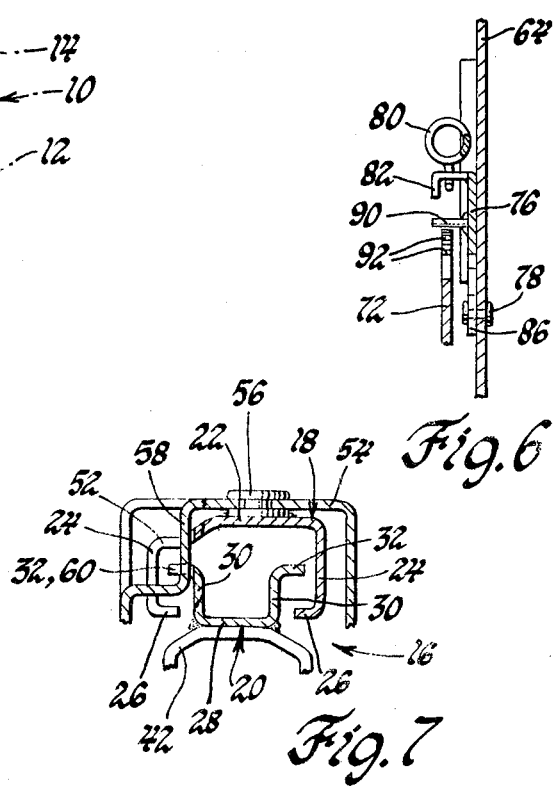
Fig. 6
Fig. 7

SEAT POSITION CONTROL MECHANISM

This invention relates to seat position control mechanisms for vehicle seats and more particularly to such a mechanism which provides for forward displacement of a vehicle seat to an easy enter position and return of the seat to the initial starting position upon forward tilting movement of a vehicle seat back from an upright position and also provides for rearward movement of the seat back to a plurality of reclined positions.

BACKGROUND OF THE INVENTION

It is known to provide vehicle seats which can be displaced from any one of a number of horizontally adjusted positions to an easy enter position and return to the initial starting position upon movement of a vehicle seat back between upright and tilted positions. It is also known to provide vehicle seats with seat backs which can be moved from upright position to one or more rearwardly reclined positions. The seat position control mechanism of this invention provides for both such features to provide a maximum range of movement of the seat back for comfort purposes as well as ease of entrance and exit for rear seat passengers.

In the preferred embodiment of the invention, the seat is mounted on the vehicle for movement to a plurality of horizontally adjusted positions by means of track members, and a locking means is provided to releasably hold the track members in any one of the adjusted positions. The easy enter displacement mechanism includes actuating and operating members. The actuating member is pivoted to the seat and pivotally and slidably connected to the vehicle for displacing the seat forwardly upon release of the locking means and movement of the actuating member about the seat pivot. The operating member is secured to the seat back and freely pivotally connected to the actuating member for movement from an upright position either to a rearwardly inclined position or to a forwardly tilted position. A pawl and ratchet mechanism is provided to connect the operating member and the actuating member. The pawl and ratchet mechanism is normally blocked against engagement unless the seat back is tilted forwardly from upright position. Thus, the seat back can be moved from the upright position to any one of a number of rearwardly inclined positions without connection of the operating and actuating members. The locking means is released by a cam and follower arrangement operable upon connection of the operating and actuating members to thereby release the track members for movement of the seat to easy enter position.

The operator may thus freely adjust the seat to any of a number of horizontal adjusted positions as well as recline the seat back to any of a number of positions without actuation of the actuating member. Only upon forward movement of the seat back toward the tilted position is an operative connection established between the seat back and the displacement mechanism to provide for displacement of the seat to the easy enter position and return of the seat to the initial starting position.

The primary feature of this invention is that it provides an improved seat position control mechanism which permits a seat back to be moved rearwardly from an upright position to a number of rearwardly inclined positions and includes a displacement mechanism providing for displacement of the seat to an easy enter position and return to an initial starting position upon forward movement of the seat back toward a tilted position and return to an upright position. Another feature is that the seat back is normally freely pivotable relative to the seat and an operative connection between the seat back and the displacement mechanism is established only when the seat back is tilted forwardly from upright position. A further feature is that a pawl and ratchet mechanism is provided to operatively connect the seat back to the displacement mechanism, with the pawl and ratchet mechanism being blocked against engagement when the seat back is in the upright position or a rearwardly inclined position. Yet another feature is that a cam and follower mechanism is provided to release the locking means normally holding the track members in any one of the adjusted positions, with the cam and follower arrangement being operable upon forward movement of the seat back from upright position to tilted position.

These and other features of the invention will be readily apparent from the following description and drawings wherein:

FIG. 4 is a partial view similar to FIG. 2 showing the seat back in a full tilted position and the seat in the same position as in FIG. 3.

FIG. 5 is a sectional view taken generally along the plane indicated by line 5—5 of FIG. 1.

FIG. 6 is a sectional view taken generally along the plane indicated by line 6—6 of FIG. 1, and FIG. 7 is a sectional view taken generally along the plane indicated by line 7—7 of FIG. 1.

Figure 1:
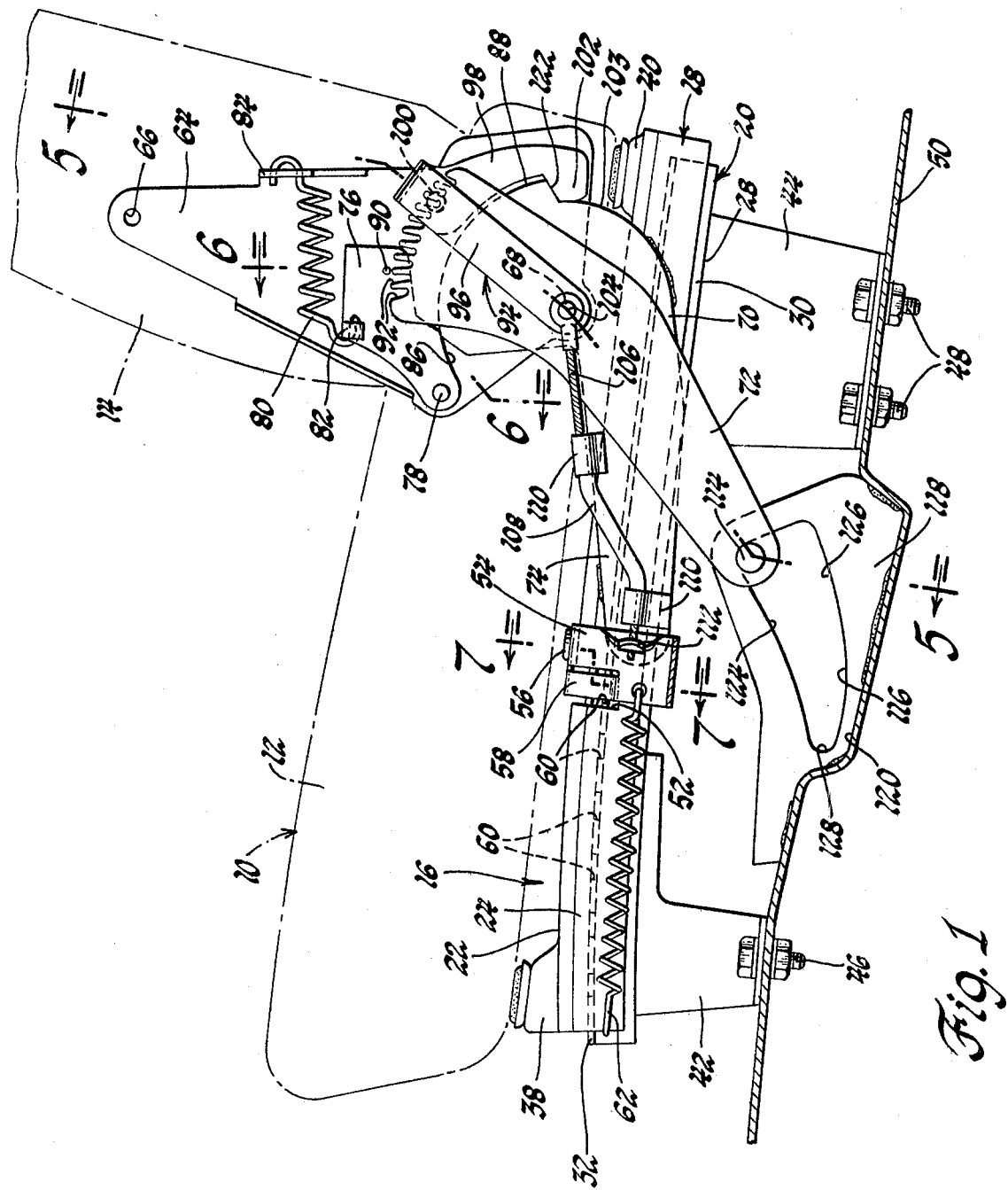
FIG. 1 is a side elevational view of a vehicle seat embodying a seat position control mechanism according to this invention with the seat being shown in the full rearwardly adjusted position and the seat back being shown in an upright position.

Referring now to FIG. 1 of the drawings, a conventional vehicle seat 10 includes a seat cushion 12 and a seat back 14. The frame or support structure of the seat cushion and seat back are not shown since they can be of any known structure. The seat 10 is supported on the vehicle for movement to a plurality of horizontally adjusted positions by a conventional track mechanism 16 which includes an upper track member 18 and a lower track member 20. As shown in FIG. 5, the track member 18 is of generally U-shaped configuration and includes an upper wall 22, a pair of side walls 24, the outboard side wall being of less vertical depth than the inboard side wall, and a pair of terminal flanges 26. The lower track member 20 is likewise of U-shaped configuration and includes a lower wall 28, a pair of side walls 30 and a pair of terminal flanges 32. A plurality of rollers 34 engage the walls 22 and 28 of the track members to vertically space the track members and a plurality of ball bearings 36 engage the side walls 24 and 30 and the flanges 26 and 32 of the track members to horizontally locate the track members relative to each other. Although a specific track mechanism has been shown, other mechanisms may be used. The frame of seat cushion 10 is secured to the wall 22 of track member 18 by conventional forward and rearward brackets 38 and 40, respectively, and the track member 20 is supported on the vehicle by forward and rearward U-shaped brackets 42 and 44 having their bases secured to the lower wall 28 and their flanged legs bolted at 46 and 48 respectively to the vehicle floor pan 50. The track members 18 and 20 thus support the seat 10 on the vehicle for horizontal movement forwardly and rearwardly thereof.

The outboard wall 24, flange 26, and the outboard edge portion of wall 22 of the track member 18 are slotted at 52 as shown in FIG. 7. A generally U-shaped latch member 54 is pivoted at 56 to the wall 22 of track member 18 and a strap 58 thereof is lanced and displaced inwardly into an L-shaped configuration for movement within the slot 52 inwardly and outwardly of a plurality of slots 60 provided in the outboard flange 32 of the lower track member 28. Each of the slots 60 defines a horizontally adjusted position of the track members 18 and 20 relative to each other. The engagement of the strap 58 of the latch member 54 in any one of the slots 60 fixes the track members in a horizontally adjusted position of the seat. A tension spring 62 is hooked between the forward edge of the outboard wall 24 of track member 18 and the latch member 54 to continually bias the latch member toward the inner track member 18 and hold the strap 58 of the latch member in engagement with one of the slots 60. Although not shown in the drawings, but conventionally provided in horizontally adjustable vehicle seats, a coil tension spring is hooked between the forward edge of the inboard side wall 30 of the lower track member 18 and the rearward edge of the inboard side wall 24 of the upper track member to bias the upper track member 18 forwardly or to the left as shown in FIG. 1 whenever the latch member 54 is rotated about the pivot 56 to a position wherein the strap 58 is out of engagement with any one of the slots 60.

The seat position control mechanism of this invention includes an operating member 64 which is fixed at a number of places 66 to the outboard side of the frame of the seat back 14. The member 64 is pivoted at 68, FIG. 5, to a support member 70 and to an actuating member 72. The support member 70 is generally L-shaped as shown in FIGS. 1 through 4 and has an elongated leg portion 74 thereof welded or otherwise fixedly secured to the outboard side wall 24 of the upper track member 18. A pawl 76 is pivoted at 78 to the operating member 64. A coil tension spring 80 is hooked between an integral tab 82 of the pawl and a lateral flange 84 of the member 64 to continually bias the pawl 76 clockwise about the pivot 78 as viewed in FIGS. 1 through 4. The pawl includes a lower arcuate cam edge portion 86 which is generated about the pivot 68 and normally engages an arcuate cam edge portion 88 provided on the shorter leg of the support member 70. The pawl mounts a lateral pin 90 which is engageable in any one of a number of upwardly opening slots 92 of the actuating member 72 to couple the actuating member to the operating member as will be further described.

A generally U-shaped follower member 94 straddles the actuating member 72 and includes an outboard leg 96 and an inboard leg 98 which is pivoted at 100, FIG. 5, to the operating member 64. The inboard leg 98 includes a follower 102 which normally engages an arcuate edge portion 103 of the support member 70 generated about the pivot 68. The outboard leg 96 is pivoted at 104 to one end of a cable 106, with the pivot 104 being coaxial with the pivot 68 as shown in FIG. 5. A guide tube 108 is fixed by brackets 110 to the leg 74 of the support member 70 and the cable 106 extends through the guide tube for connection at 112 to the latch member 54. The actuating member 72, as shown in FIG. 5, pivotally mounts a roller 114 adjacent its lower end. The roller 114 is pivotally and slidably received within an opening 116 of a vertical bracket 118 welded or otherwise secured within a depression 120 of the floor pan 50.

FIG. 1 shows the seat 10 in a full rearwardly adjusted position with the seat back 14 in an upright position. The engagement of the strap 58 of the latch member 54 in the rearwardmost slot 60 holds the seat in this position against the bias of the spring, not shown, interconnecting the track members 18 and 20. The edge portion 86 of pawl 76 engages the edge portion 88 of support 70 against the bias of spring 80 to locate the pin 90 outwardly of the slots 92 of the actuating member 72. The engagement of the follower 102 of the follower member 94 with the edge portion 103 of support member 70 tensions the cable 106 between the latch member 54 and the follower member 94 without moving the latch member.

If it is desired to move the seat back 14 rearwardly to an inclined position, the operator moves the seat back rearwardly to rotate the operating member 64 clockwise relative to the actuating member 70 about the pivot 68. The edge portion 86 of pawl 76 moves along the edge portion 88 of support member 70 and maintains the pin 90 out of engagement with the slots 92. Likewise, the follower 102 moves along the edge portion 103 of support member 70 but has no effect on the latch member 54 since the pivot 100 of the follower member 94 to the cable 106 is coaxial with the pivot 68. Thus, the seat position control mechanism permits the seat back to be pivoted rearwardly to any inclined position desired. Although not shown herein, any one of a number of conventional friction or other type mechanisms may be used between the members 64 and 70 to maintain the seat back 14 in any rearwardly inclined position.

Figure 2:
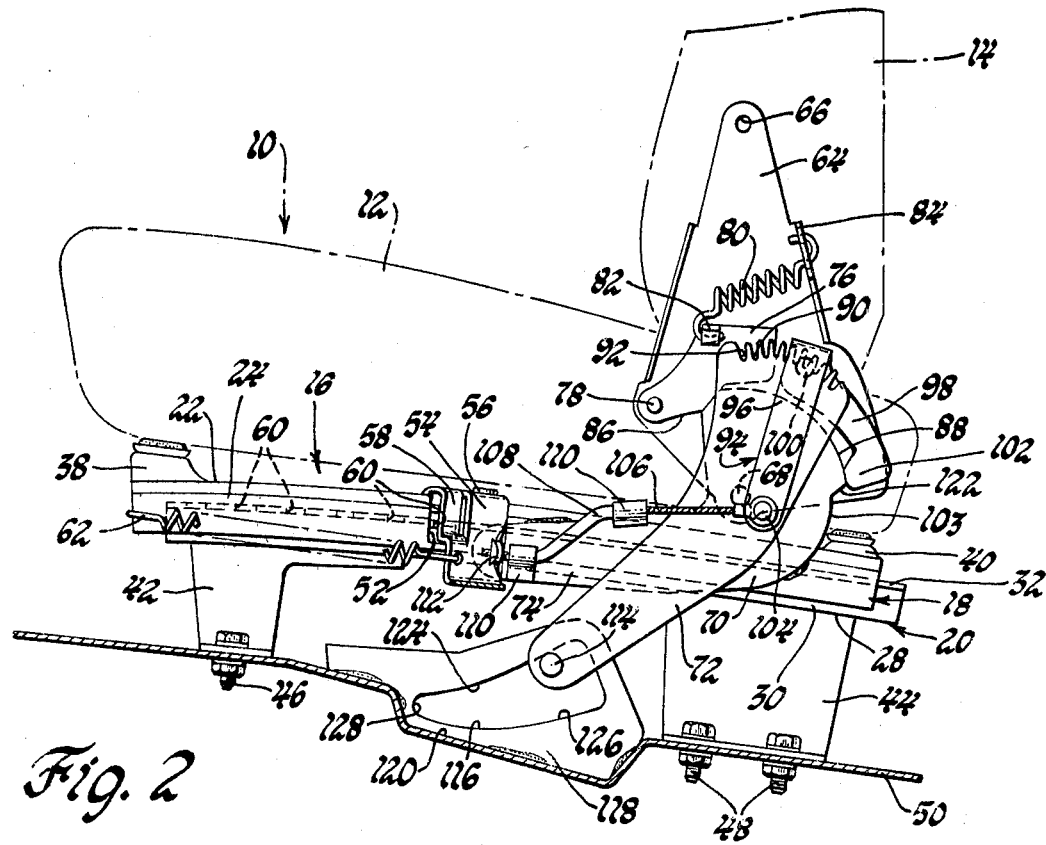
FIG. 2 is a view similar to FIG. 1 showing the seat back in an initial tilted position.
Figure 3:
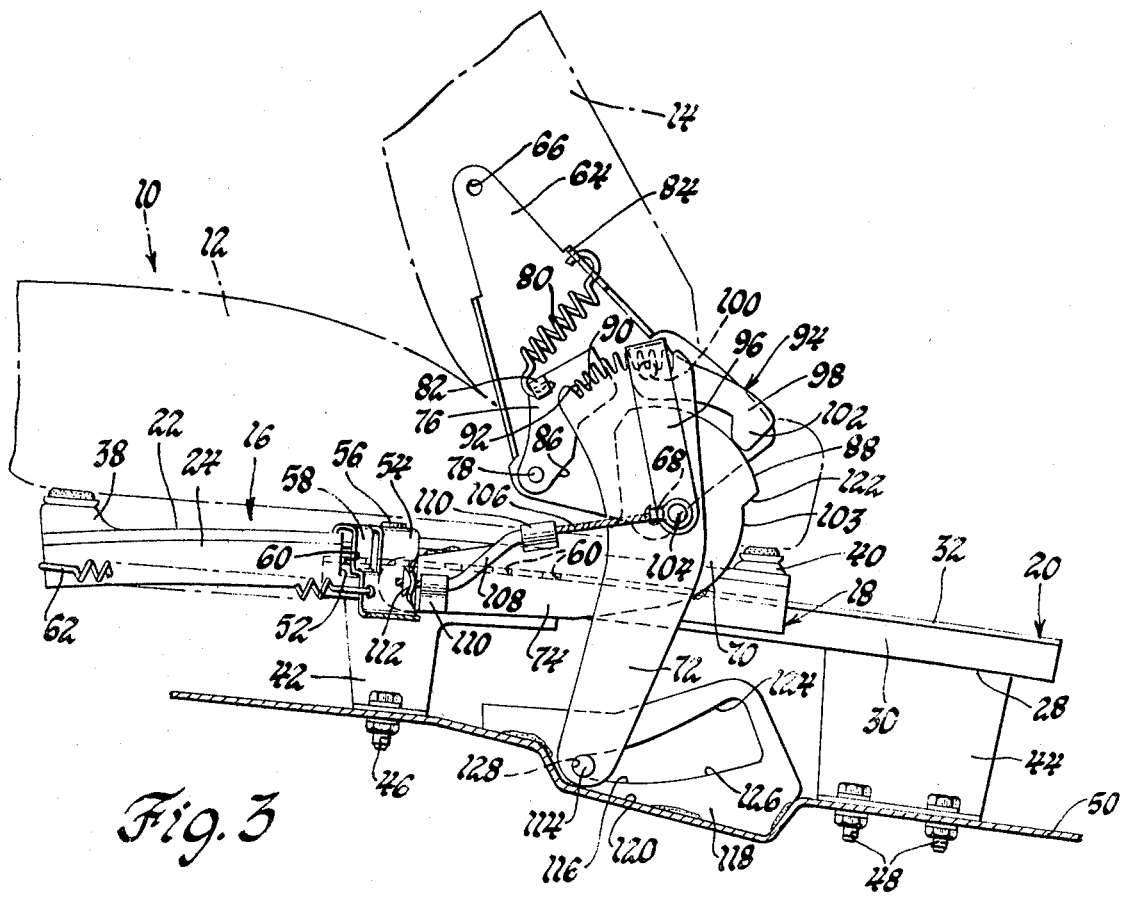
FIG. 3 is a partial view similar to FIG. 2 showing the seat back in an intermediate tilted position and the seat in a full forwardly displaced position or easy enter position.

If it is desired to move the seat forwardly from the initial starting position of FIG. 1 to the easy enter position of FIG. 3, the operator moves the seat back 14 forwardly or counterclockwise relative to the seat cushion 12. Upon initial tilting movement of the seat back 14, with reference to FIGS. 1 and 2, the operating member 64 initially pivots counterclockwise relative to the support member 70 about the pivot 68. Upon such initial pivoting movement, the pawl moves with the operating member and the cam edge portion 86 of the pawl 76 moves off the edge portion 88 of the support member 70 so that the spring 80 pivots the pawl 76 clockwise about the pivot 78. This moves the pin 90 into one of the slots 92 to thereby couple the operating member 64 to the actuating member 72, as shown in FIG. 2.

Further, during such initial pivoting movement of the operating member 64, the follower member 94 also moves with the operating member and the follower 102 rides up a shoulder 122 and on to the edge portion 88 to pivot the member 94 slightly counterclockwise about the pivot 100. This shifts the cable 106 rearwardly and pivots the latch member 54 about the pivot 56 to move the strap 58 out of engagement with the slot 60 to uncouple the track members 18 and 20. Thus, upon initial tilting movement of the seat back 14, the operating member 64 is operatively connected to the actuating member 72 and the latch member 54 is released. Upon slight further initial tilting movement of the seat back 14, the roller 114 will start to move forwardly along the upper edge 124 of the opening 116 from its FIG. 1 position to its FIG. 2 position to start to cam the seat forwardly or to the left to the easy enter position. The bias of the tension spring (not shown) between the track members aids the movement of the track member 18 forwardly or to the left relative to track member 20.

Upon further tilting movement of the seat back 14 from the FIG. 2 initial position to the FIG. 3 intermediate position, the seat is displaced to the full forward position as the member 114 moves along the edge 124 to the forward end thereof. The follower 102 moves along the edge portion 88 to maintain the latch member 54 in released position and the bias of spring 80 maintains the pin 90 in the slot 92. FIG. 3 shows the seat in full forwardly displaced position wherein the upper track member 18 is displaced to the forwardmost position relative to the lower track member 20. However, the seat back 14 is in an intermediate tilted position and additional rear entrance room can be obtained by further tilting the seat back 14 relative to the seat cushion 12 to the FIG. 4 position. During this movement of the seat back, the operating and actuating members 64 and 72 remain coupled to each other by the pin 90 and the follower 102 will move further counterclockwise along the edge portion 88 as the actuating and operating members pivot as a unit about the pivot 68. The roller 114 moves rearwardly along the lower edge 126 of the opening 116 from the junction 128 of the upper and lower edges.

When it is desired to return the seat to its initial starting position of FIG. 1, the seat back 14 is moved rearwardly by the operator and the successive engagement of the roller 114 with the lower edge 126, the junction 128 and the upper edge 124 of the opening 116 of bracket 118 will cam the seat rearwardly as the upper track member 18 moves rearwardly relative to the lower track member 20. During such rearward movement the follower 102 will move clockwise along the edge portion 88 to maintain the latch member 54 in released position. When the seat has moved through the FIGS. 3 and 2 positions and reaches its initial starting position of FIG. 1, the follower 102 will have moved clockwise from the edge portion 88 down the shoulder 122 and into engagement with the edge portion 103 to release cable 106 and permit the spring 62 to return the latch member 54 to its engaged position with strap 58 in engagement with the slot 60 indicative of the initial starting position. Further, the edge portion 86 of the pawl 76 moves back onto the edge portion 88 to move the pin 90 out of the particular slot 92 engaged thereby to thereby again release or uncouple the operating member 64 from the actuating member 72.

The foregoing description has assumed that the seat was in its full rearwardmost position at the start of the displacement of the seat to the easy enter position. If the seat is in a position forward of the rearwardmost position, the description will be equally applicable. However, the pin 90 will have engaged a slot 92 clockwise of the particular slot shown and likewise the roller 114 will be further forwardly along the upper edge 124 of opening at the start of the movement of the seat to the easy enter position, the FIG. 1 position.

Although no structure is shown to normally hold the seat back 14 in an upright position, the mechanism used to hold the seat in an inclined position may be used for this purpose or other known mechanisms may be used.

Thus this invention provides a seat position control mechanism for a vehicle seat which permits the seat to be moved from any horizontally adjusted position to an easy enter position and returned to the initial starting position as well as permitting the seat back to be moved to a rearwardly inclined position when desired by an operator without actuation of the seat displacement mechanism.

The embodiments of the invention in which an exclusive property or privilege is claimed are defined as follows:

1. In a vehicle seat including a seat back movable from an upright position rearwardly to a plurality of inclined positions or forwardly to a tilted position, means for mounting the seat on a vehicle for movement to a plurality of adjusted positions and from any adjusted position to an easy enter position, a seat position control mechanism comprising, actuating means operable by tilting movement of the seat back to displacement the seat from any one of the adjusted positions to the easy enter position, means blocking operative connection of the actuating means to the seat back when the seat back is in the upright position and in any of the inclined positions, and means operated by forward movement of the seat back toward tilted position for operatively connecting the seat back to the actuating means.

2. In a vehicle seat including a seat back movable rearwardly from an upright position to an inclined position or forwardly to a tilted position, means for mounting the seat on a vehicle for movement to a plurality of adjusted positions and an easy enter position, and means releasably locking the seat in any one of the adjusted positions, a seat position control mechanism comprising, actuating means operable by tilting movement of the seat back to displace the seat from any one of the adjusted positions to the easy enter position, means blocking operative connection of the actuating means to the seat back when the seat back is in the upright position and inclined position, means operated by forward movement of the seat back toward tilted position for operatively connecting the seat back to the actuating means, and means releasing the locking means upon establishment of an operative connection of the actuating means to the seat back to permit movement of the seat to the easy enter position.

3. In a vehicle seat including a seat back movable rearwardly from an upright position to a plurality of inclined positions or forwardly to a tilted position, means for mounting the seat on a vehicle for movement to a plurality of adjusted positions and an easy enter position, a seat position control mechanism comprising, an actuating member pivoted to the seat and pivotally and slidably connectable to the vehicle to displace the seat from any one of the adjusted positions to the easy enter position upon movement thereof relative to the seat and vehicle, a seat back mounted member freely pivotally connected to the actuating member, interengageable pawl and ratchet means for releasably securing the seat back mounted member to the actuating member to move the actuating member relative to the seat and vehicle upon tilting movement of the seat back and thereby displace the seat from an adjusted position to the easy enter position, and means blocking engagement of the pawl and ratchet means when the seat back is in the upright position or in any of the inclined positions.

4. In a vehicle seat including a seat back movable from an upright position rearwardly to a plurality of inclined positions or forwardly to a tilted position, means for mounting the seat on a vehicle for movement to a plurality of adjusted positions and from any adjusted position to an easy enter position and return to the adjusted position, a seat position control mechanism comprising, actuating means operable by movement of the seat back forwardly from the upright position to a tilted position to displace the seat from an initial adjusted position to the easy enter position and operable by return of the seat back from the tilted position to upright position to return the seat to the initial adjusted position, means normally disconnecting the actuating means from the seat back to permit rearward movement of the seat back between the upright and inclined positions, and means operated by forward movement of the seat back from upright to tilted position for operatively connecting the seat back to the actuating means to displace the seat to the easy enter position, movement of the seat back from the tilted position to the upright position disconnecting the seat back from the actuating means when the seat returns to the initial adjusted position.

* * * * *